United States Patent
Xu et al.

(10) Patent No.: US 11,556,935 B1
(45) Date of Patent: Jan. 17, 2023

(54) FINANCIAL RISK MANAGEMENT BASED ON TRANSACTIONS PORTRAIT

(71) Applicant: International Business Machines Corporation, Armonk, NY (US)

(72) Inventors: Chun Lei Xu, Xian (CN); Jing James Xu, Xi'an (CN); Xiao Ming Ma, Xi'an (CN); Yi Shan Jiang, Beijing (CN); Lei Gao, Xian (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/386,848

(22) Filed: Jul. 28, 2021

(51) Int. Cl.
*G06Q 20/40* (2012.01)
*G06N 3/08* (2006.01)
*G06Q 40/02* (2012.01)

(52) U.S. Cl.
CPC ......... *G06Q 20/4016* (2013.01); *G06N 3/08* (2013.01); *G06Q 40/025* (2013.01)

(58) Field of Classification Search
None
See application file for complete search history.

(56) References Cited

U.S. PATENT DOCUMENTS

| | | | | |
|---|---|---|---|---|
| 10,095,992 | B1* | 10/2018 | Brestoff | G06N 3/04 |
| 2014/0304204 | A1* | 10/2014 | Cameron | G16Z 99/00 706/21 |
| 2016/0104163 | A1 | 4/2016 | Aquino | |
| 2018/0316776 | A1 | 11/2018 | Lu | |
| 2019/0066110 | A1* | 2/2019 | Shen | G06K 9/6271 |
| 2019/0311367 | A1 | 10/2019 | Reddy | |
| 2019/0378050 | A1* | 12/2019 | Edkin | G06N 20/20 |

FOREIGN PATENT DOCUMENTS

| | | |
|---|---|---|
| CN | 108985553 A | 12/2018 |
| CN | 109300050 A | 2/2019 |
| CN | 111292007 A | 6/2020 |
| CN | 111429006 A | 7/2020 |
| CN | 111681091 B | 11/2020 |
| WO | WO-2018175400 A1 * | 9/2018 ............... G06N 3/04 |

OTHER PUBLICATIONS

Lv et al., "Detecting Fraudulent Bank Account Based on Convolutional Neural Network with Heterogeneous Data," Hindawi, Mathematical Problems in Engineering, vol. 2019, Article ID 3759607, 11 pages, Mar. 2019.

Modi, "Fraud Detection Technique in Credit Card Transactions using Convolutional Neural Network," International Journal of Advance Research in Engineering, Science & Technology, e-ISSN: 2393-9877, p-ISSN: 2394-2444 vol. 4, Issue 8, Aug. 2017, 8 pages.

\* cited by examiner

*Primary Examiner* — Bruce I Ebersman
*Assistant Examiner* — Matthew Cobb
(74) *Attorney, Agent, or Firm* — VanLeeuwen & VanLeeuwen; Matt Zehrer

(57) ABSTRACT

An approach is provided in which the approach constructs a 3-dimensional (3D) matrix based on a plurality of historical transactions performed by a user. The 3D matrix includes a set of features, a set of rows, and a set of channels. The approach trains a convolutional neural network using the 3D matrix, and then uses the trained convolutional neural network to predict a risk level of a new transaction initiated by the user. The approach transmits an alert message based on the predicted risk level.

17 Claims, 10 Drawing Sheets

Customer A Transactions 400

Features 410

| V1 | V2 | V3 | V4 | V5 | V6 | V7 | V8 | V9 | V10 | Risk |
|----|----|----|----|----|----|----|----|----|-----|------|
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 0 |
| xx | xx | xx | xx | xx | xx | xx | xx | xx | xx | 1 |

FINANCIAL RISK MANAGEMENT BASED ON TRANSACTIONS PORTRAIT

BACKGROUND

Financial risk management is the practice of protecting economic value in a firm by using financial instruments to manage exposure to risk, such as operational risk, credit risk, market risk, business risk, and legal risk. Similar to general risk management, financial risk management requires identifying the risk sources, measuring the risk, and plans to address the risk. Similar to risk management, financial risk management focuses on when and how to hedge using financial instruments to manage costly exposures to risk.

Industries have witnessed a surge in the reliance on financial services (e.g., banking, credit cards, insurance) over the last few decades, while the advent of the Internet has led to a sharp rise in the number of online transactions. Both of these factors are driving an increase in the prevalence of financial fraud. Some of today's approaches to detect financial fraud include data mining, which involve transaction sample analysis and adding individual labels to individual transactions that appear fraudulent.

BRIEF SUMMARY

According to one embodiment of the present disclosure, an approach is provided in which the approach constructs a 3-dimensional (3D) matrix based on a plurality of historical transactions performed by a user. The 3D matrix includes a set of features, a set of rows, and a set of channels. The approach trains a convolutional neural network using the 3D matrix, and then uses the trained convolutional neural network to predict a risk level of a new transaction initiated by the user. The approach transmits an alert message based on the predicted risk level.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting a set of customer transactions of a particular user;

DETAILED DESCRIPTION

Figure 1:
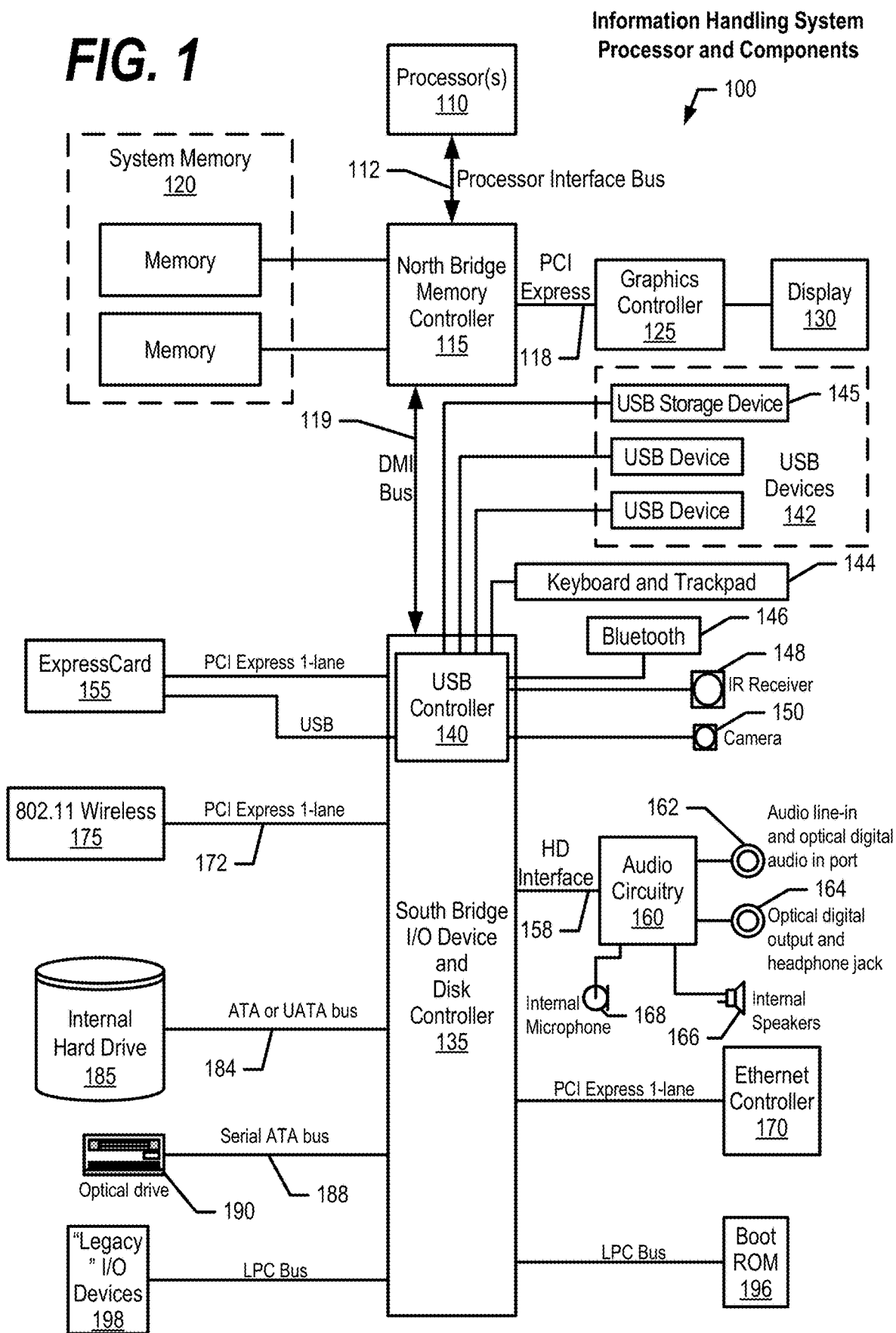
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
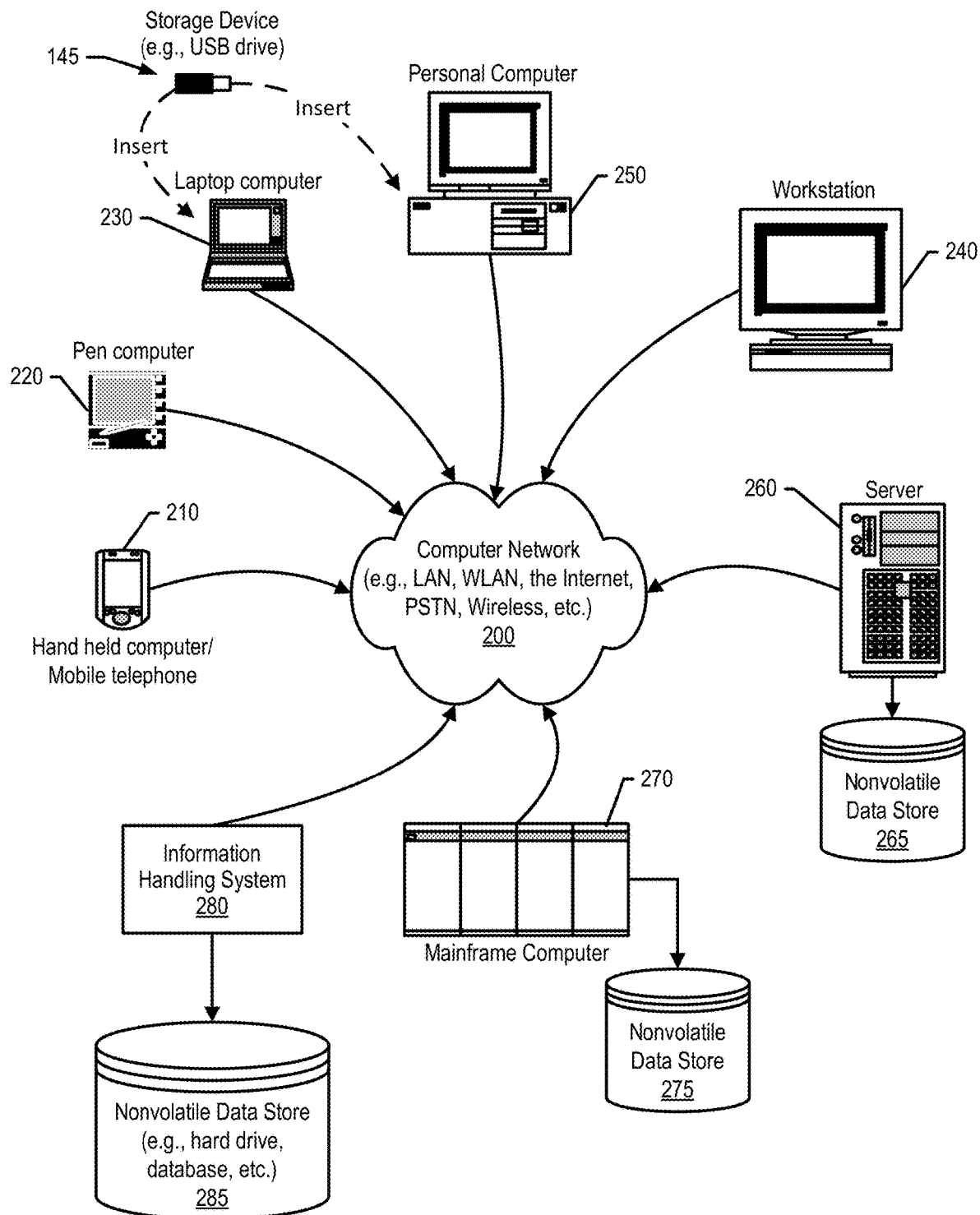
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, current approaches to perform financial risk management involve data mining and analyzing transaction samples and assigning labels to the individual transactions. In real-life, however, customer transactions are a dependent dataset and relationships exist between transactions where one transaction sample might affect another transaction. For example, if a user is going to launder money, the user might contribute normal transactions before laundering the money.

In addition, the transactions typically do not occur in a specific order and therefore are not pure time-series data. For example, one user may begin with smaller transactions, then bigger transactions, then performs credit fraud; while another user begins with large transactions, then smaller transactions, then performs credit fraud. Some users perform risk transactions quickly, while other users perform risk transactions over a long period. Furthermore, todays risk management methods apply a lagging approach where risk transactions are only analyzed (predicted) after they are authorized.

FIGS. 3 through 10 depict an approach that can be executed on an information handling system that i) extends multiple channels from a set of original transaction samples; ii) trains a convolutional neural network (CNN) model using the extended multiple channel data; and iii) uses the CNN model to predict financial risk and take actions in advance of authorizing a fraudulent transaction.

Figure 3:
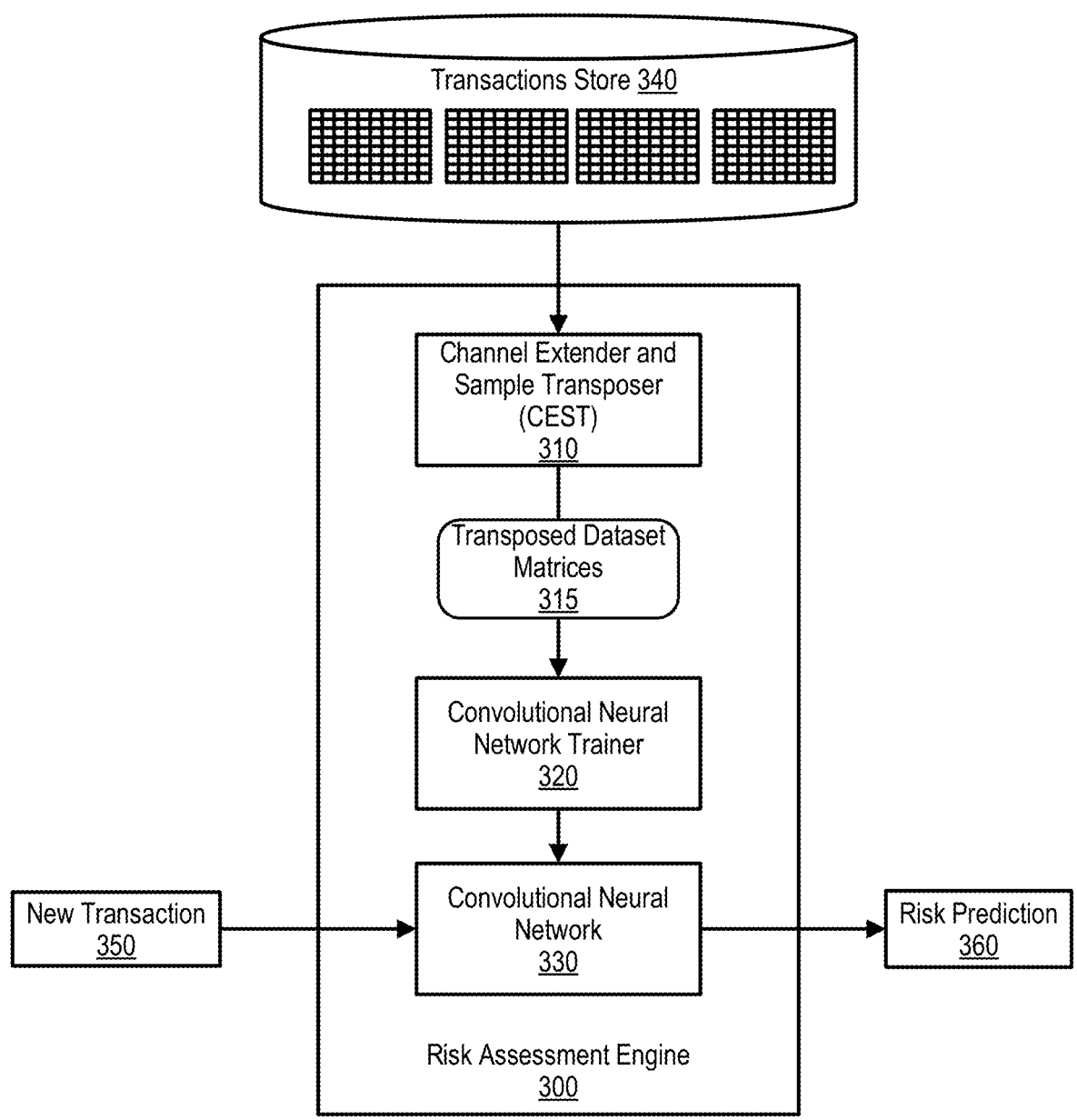
FIG. 3 is an exemplary diagram depicting a risk assessment engine preparing existing transactions into transposed dataset matrices, utilizing the transposed dataset matrices to train a convolutional neural network, and utilizing the trained convolutional neural network to generate risk predictions for new transactions.

FIG. 3 is an exemplary diagram depicting a risk assessment engine preparing existing transactions into transposed dataset matrices, utilizing the transposed dataset matrices to train a convolutional neural network, and utilizing the trained convolutional neural network to generate risk predictions for new transactions. In one embodiment, risk assessment engine 300 uses the prediction results to determine steps to further process a new transaction, such as (1) process a non-risk transaction; (2) transmit an alert message, process transaction, and accumulate risk; or (3) abort the transaction.

Risk assessment engine 300 includes channel extender and sample transponder (CEST) 310, convolutional neural network (CNN) trainer 320, and CNN 330. CEST 310 collects customer transactions from transaction store 340, which include multiple features such as transaction amounts, transaction dates, transaction locations, etc. (see FIG. 4 and corresponding text for further details). CEST 310 selects a customer, sorts the selected customer's transactions on one feature at a time to generate a set of sorted datasets (one dataset for each sorted feature). Then, CEST 310 combines the set of sorted datasets into a 3-dimensional (3D) dataset matrix, which CEST 310 transposes into one of transposed dataset matrices 315 (see FIGS. 5, 7, and corresponding text for further details). Transposed dataset matrices 315 include one transposed dataset matrix for each customer. CEST 310 then feeds transposed dataset matrices 315 into CNN trainer 320.

CNN trainer 320 receives transposed dataset matrices 315 and extracts complex features from transposed dataset matrices 315. CNN trainer 320 then builds CNN 330 based on the defined layers and parameters. CNN trainer 320 then trains CNN 330 using transposed dataset matrices 315 and, once trained, CNN 330 is ready to perform risk predictions based on new transaction 350 (see FIGS. 7, 8, and corresponding text for further details).

CNN 330 receives new transaction 350 and computes risk prediction 360 based on its previous training. In one embodiment CNN 330 labels new transaction 350 as either valid (0) or fraudulent (1). In one embodiment, when customer transaction 360 is labeled as fraudulent, risk assessment engine 300 closes the customer's account. Customer transactions that are labeled as valid are appended to the particular customer's existing transactions in transactions store 340, whereupon CEST 310 sorts and transforms the updated dataset into an updated transposed dataset matrix that CNN 320 uses to retrain CNN 330.

In one embodiment, risk assessment engine 300 uses an adaptive kernel based on risk types. In this embodiment, the adaptive kernel for CNN 330 adaptively adjusts according to different risk types where the corresponding different risk transactions features are extracted to a uniform output. In this embodiment, a kernel may have an initial size of 3×3 after training but, after analysis, the kernel's result too sensitive. As such, the kernel adaptively adjusts to a size of 4×4 and produces more accurate results.

FIG. 4 is an exemplary diagram depicting a set of customer transactions of a particular user. Customer A transactions 400 include individual transactions in each row with a set of features 410. For example, features 410 may include date, transaction amount, transfer recipient, location of transaction, etc. Column 420 includes a risk assessment where row 430 shows a fraudulent risk assessment ("1") from historical data, real data, manual entry, etc. to train CNN 330.

Figure 5:
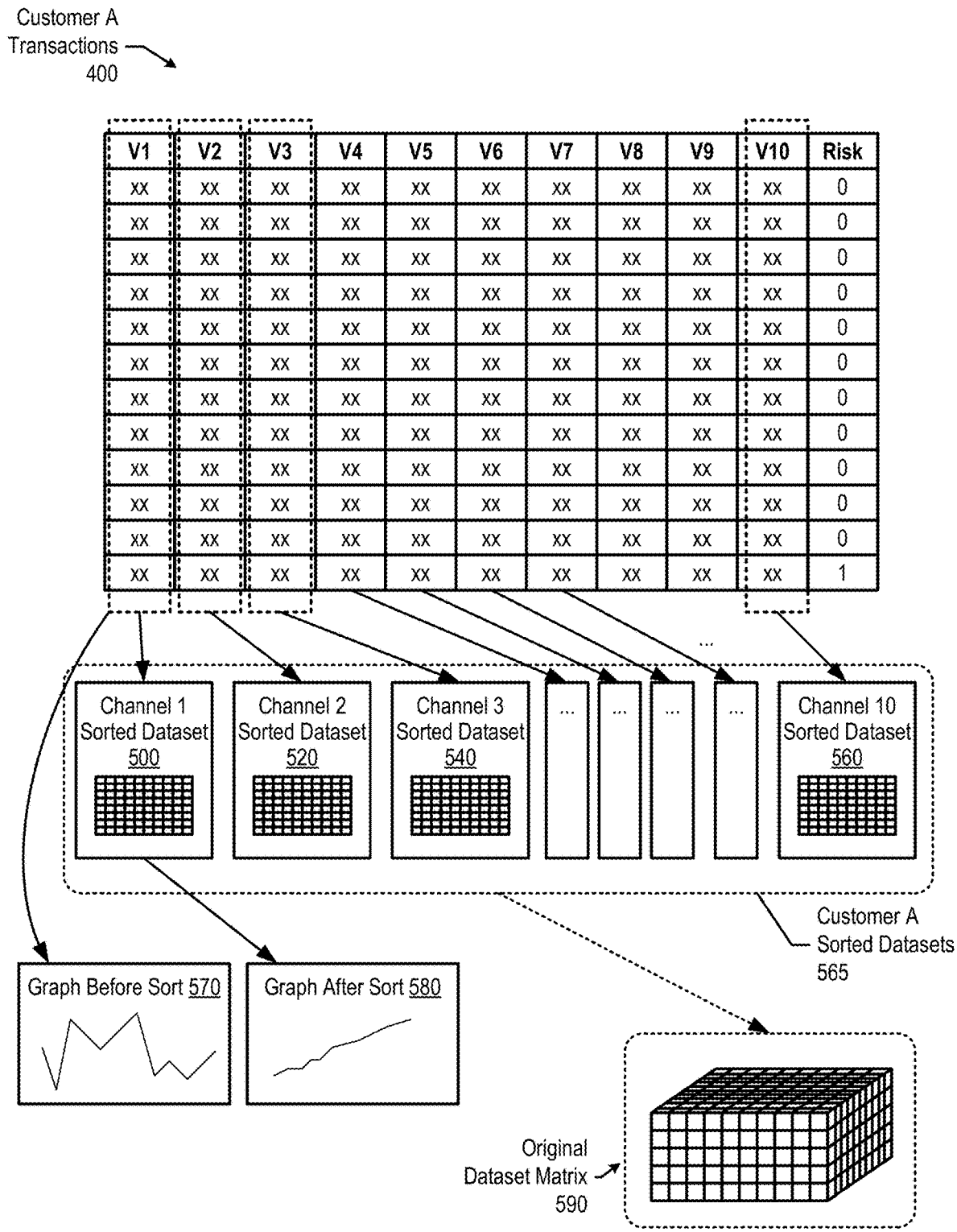
FIG. 5 is an exemplary diagram depicting sorted datasets generated for each feature in a set of customer transactions and combining the sorted datasets into an original dataset matrix.

FIG. 5 is an exemplary diagram depicting sorted datasets generated for each feature in a set of customer transactions and combining the sorted datasets into an original dataset matrix.

Customer A transactions 400 include features V1 through V10. CEST 310 first sorts on feature V1 and creates channel 1 sorted dataset 500. Graph before sort 570 shows that values of V1 are somewhat random, and graph after sort 580 shows that values of V1 are linear. CEST 310 then sorts on feature V2 to create channel 2 sorted dataset 520, sorts on feature V3 to created channel 3 sorted dataset 540, and so on to eventually sort on feature V10 to create channel 10 sorted dataset 560, resulting in customer A sorted datasets 565. In one embodiment CEST 310 pre-processes customer A transactions 400 so that the number of transactions equals a predefined number of rows via under/over sampling in order for each customer to have the same number of rows (see FIGS. 7, 8 and corresponding text for further details).

CEST 310 then uses customer A sorted datasets 565 to create original dataset matrix 590. CEST 310 then transposes original dataset matrix 590 and feeds the transposed dataset matrix to CNN trainer 320 (see FIGS. 7, 8 and corresponding text for further details).

Figure 6:
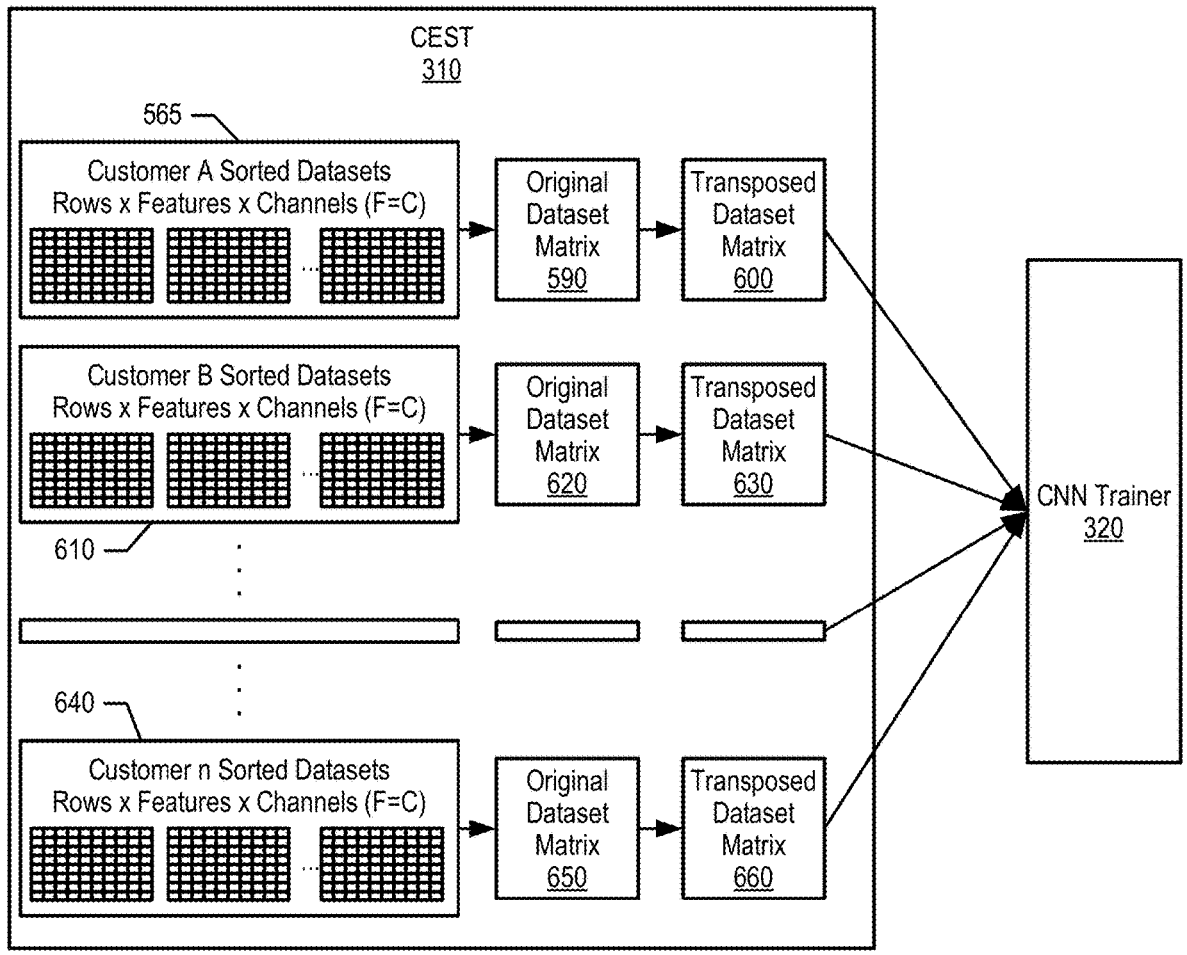
FIG. 6 is an exemplary diagram depicting a channel extender and sample transponder (CEST) creating multiple transposed dataset matrices corresponding to multiple customers.

FIG. 6 is an exemplary diagram depicting CEST 310 creating multiple transposed dataset matrices corresponding to multiple customers. As discussed herein, CEST 310 processes customer transactions and generates a transposed dataset matrix on an individual customer basis. FIG. 6 shows that CEST 310 creates customer A sorted datasets 565 and original dataset matrix 590 as discussed above. CEST 310 then transposes original dataset matrix 590 into transposed dataset matrix 600 (see FIG. 7 and corresponding text for further details).

CEST 310 then sorts customer B transactions per feature and creates customer B sorted transactions 610. CEST 310 then generates original dataset matrix 620 from customer B sorted datasets 610, and generates transposed dataset matrix 630 from original dataset matrix 620. CEST 310 performs these steps for each customer, which includes sorting customer n transactions per feature and creating customer n sorted transactions 640, generating original dataset matrix 650 from customer n sorted datasets 640, and generating transposed dataset matrix 660 from original dataset matrix 650.

Figure 7:
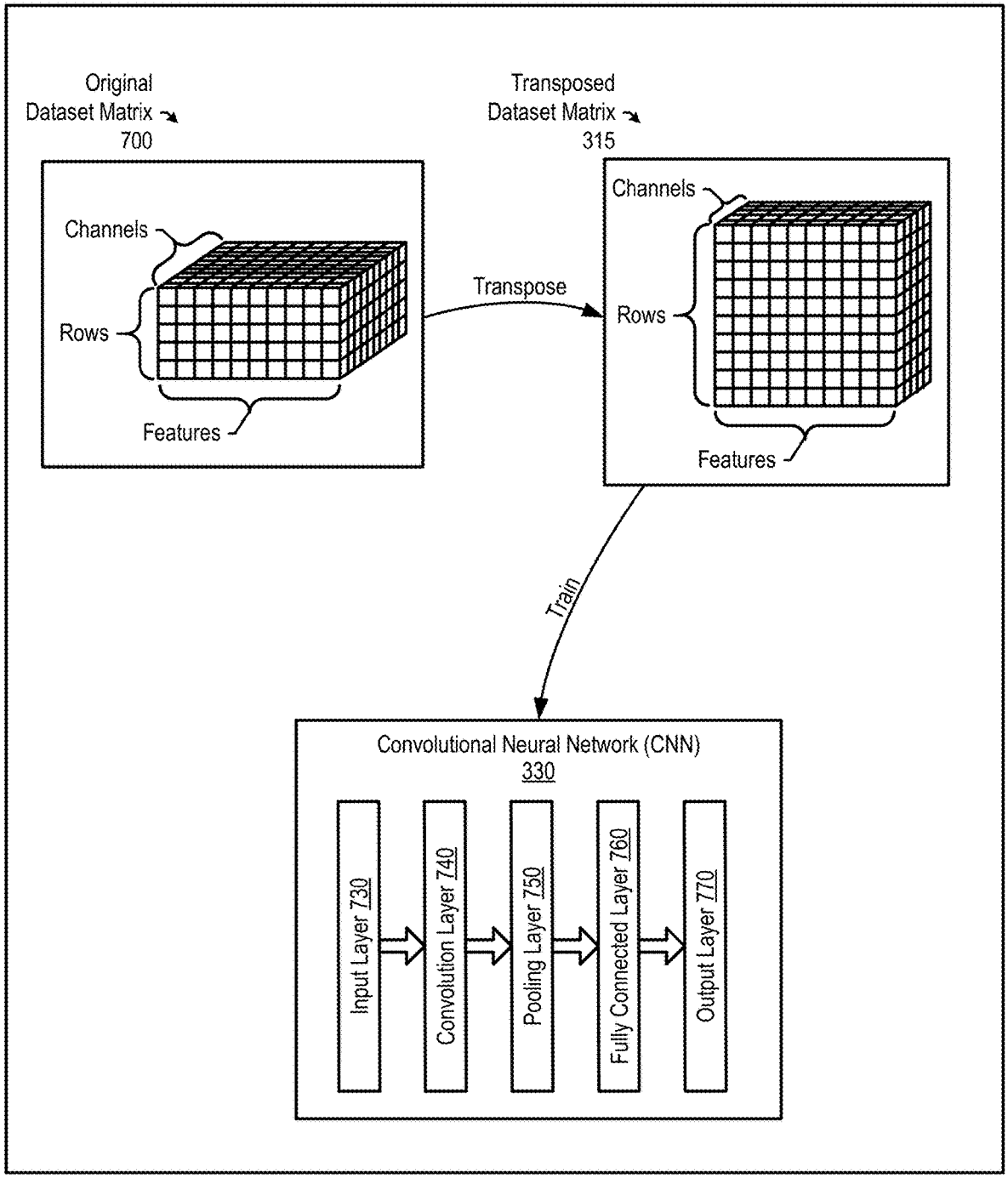
FIG. 7 is an exemplary diagram depicting an original dataset matrix being transposed and utilized to train a convolutional neural network.

In turn, CEST 310 sends the transposed dataset matrices 600, 630, and 660 to CNN trainer 320, which CNN trainer 320 uses to train CNN 330 (see FIG. 7 and corresponding text for further details).

FIG. 7 is an exemplary diagram depicting an original dataset matrix being transposed and utilized to train a convolutional neural network. Original dataset matrix 700 has a format of Rows (transactions)×Features×Channels (sorted datasets). As discussed above, the number of sorted datasets equals the number of transactions (e.g., #Features=#Channels).

In one embodiment, a customer's corresponding original dataset matrix size (R×F×C) may be not suitable to some algorithms because some algorithms may expect R×F×C to be the same for each customer. In this embodiment, CEST 310 adjusts the customer's transactions accordingly such that the modified customers' transactions produce a particular original dataset matrix size. In this embodiment, CEST 310 adjusts the customer's transactions using various approaches such as i) labeling features and excluding the negative labels (excluding '1' label transactions; ii) predefining a limitation of R where different customers have different rows of transactions; iii) sampling on original samples where CEST 310 under samples on a customer's samples whose size is larger than the expected R via random MCMC (Markov Chain Monte Carlo); over samples on a customer's samples whose sample size is smaller than the expected via SMOTE (Synthetic Minority Over-sampling Technique) or ADASYN (Adaptive Synthetic Sampling), etc. In one embodiment, if the sample size is smaller than the expected R, CEST 310 pads the customer transactions with all-0 rows.

Once original dataset matrix 700 is the correct size, CEST 310 transposes original dataset matrix 700 on the channels to accommodate CNN training approaches that require the width be equal to the height. Referring to original dataset matrix 700, the number of features is required to equal the number of rows. As such, because the number of channels will equal the number of features due to dataset generation discussed herein, CEST 310 transposes original dataset matrix 700 to transposed dataset matrix 315 where the width will be equal to the height. In one embodiment, CEST 310 initiates a new 3D array with size F*C*R, then copies each value from an original index $R_n F_n C_n$ to a new index $F_n C_n R_n$.

In one embodiment, CNN trainer 320 extracts complex features from the multiple transposed dataset matrices and creates CNN 330 having layers 730 through 770. In this embodiment, CNN trainer 320 may define layer-specific parameters such as i) Input layer 730: Each sample is a 3D matrix: R×F×C; ii) Convolution layer 740: Filter size: 3×3; Filter number: 10; Padding: 0; Stride: 1; iii) Pooling layer 750: Method: Max pooling; Filter size: 3×3; Stride: 1; iv) Fully connected layer 760: Activation: ReLU (Rectified Linear Units); and v) Output layer 770: Activation: Softmax; Output dimension: 1. CNN trainer 320 may define other layers and parameters such as more convolution layers, more fully connected layers, more pooling layers, more flatten layers, etc.

CNN trainer 320 then trains CNN 330 using transposed dataset matrices 315 using criteria such as:
  Training dataset. N samples where each sample is a transposed dataset matrix R×F×C.
  Training labels (targets): For binary classification: 0 (valid) or 1 (fraud). For multiple classification use labels of the customer transactions portrait (e.g., premium, normal, VIP; or risk level lower, higher, etc.)
  Defined parameters: a) Loss function: sparse categorical cross entropy, binary cross entropy; b) Batch, epoch, optimizer, learning rate, metrics.

Figure 8:
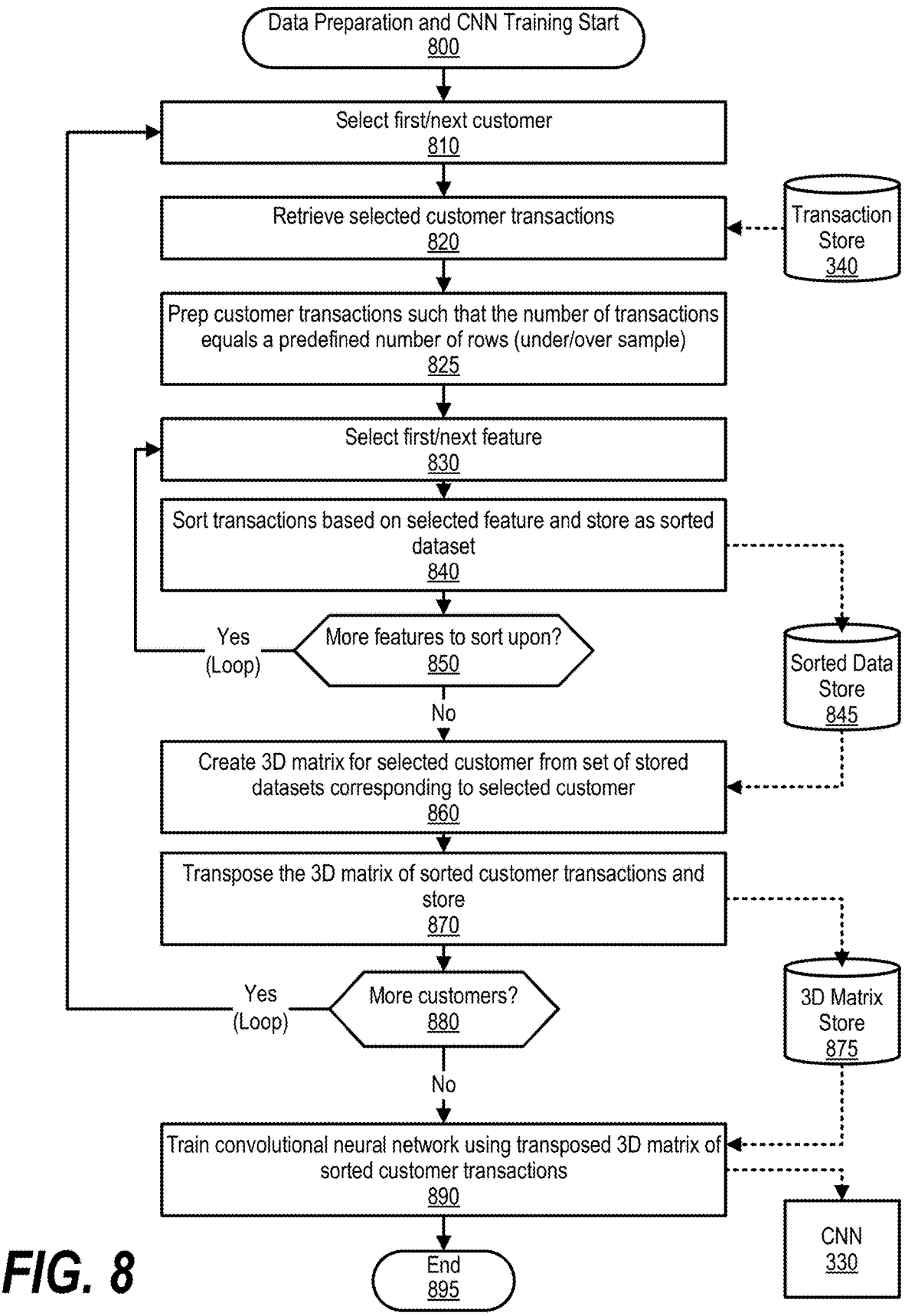
FIG. 8 is an exemplary flowchart depicting steps taken to process existing customer transactions and train a convolutional neural network.

FIG. 8 is an exemplary flowchart depicting steps taken to process existing customer transactions and train convolutional neural network 330. FIG. 8 processing commences at 800 whereupon, at step 810, the process selects a first customer. At step 820, the process retrieves selected customer transactions from transaction store 340. At step 825, the process preps customer transactions such that the number of transactions equals a predefined number of rows (under/over sample).

At step 830, the process selects the first feature. At step 840, the process sorts transactions based on selected feature and stores the sorted transactions as a sorted dataset in sorted dataset store 845. The process determines as to whether there are more features to sort upon (decision 850). If there are more features to sort upon, then decision 850 branches to the 'yes' branch which loops back to select the next feature, sort on the feature, and generate another sorted dataset for the selected customer's transactions. This looping continues until the process generates a sorted dataset for each feature, at which point decision 850 branches to the 'no' branch exiting the loop.

At step 860, the process retrieves the set of sorted datasets from sorted dataset store 845 corresponding to the selected customer and creates a 3D matrix from the set of sorted datasets. At step 870, the process transposes the 3D matrix of sorted customer transactions and stores the transposed 3D matrix in 3D matrix store 875 (see FIG. 7 and corresponding text for further details).

The process determines as to whether there are more customers (decision 880). If there are more customers, then decision 880 branches to the 'yes' branch which loops back to select the next customer; generate sorted datasets for the next customer; create a next 3D matrix from the set of datasets for the next customer, and transpose the next 3D matrix as discussed above. This looping continues until each customer's transactions have been processed, at which point decision 880 branches to the 'no' branch exiting the loop.

At step 890, the process trains convolutional neural network 330 using the set of transposed 3D matrices of the customers stored in 3D matrix store 875. FIG. 8 processing thereafter ends at 895.

Figure 9:
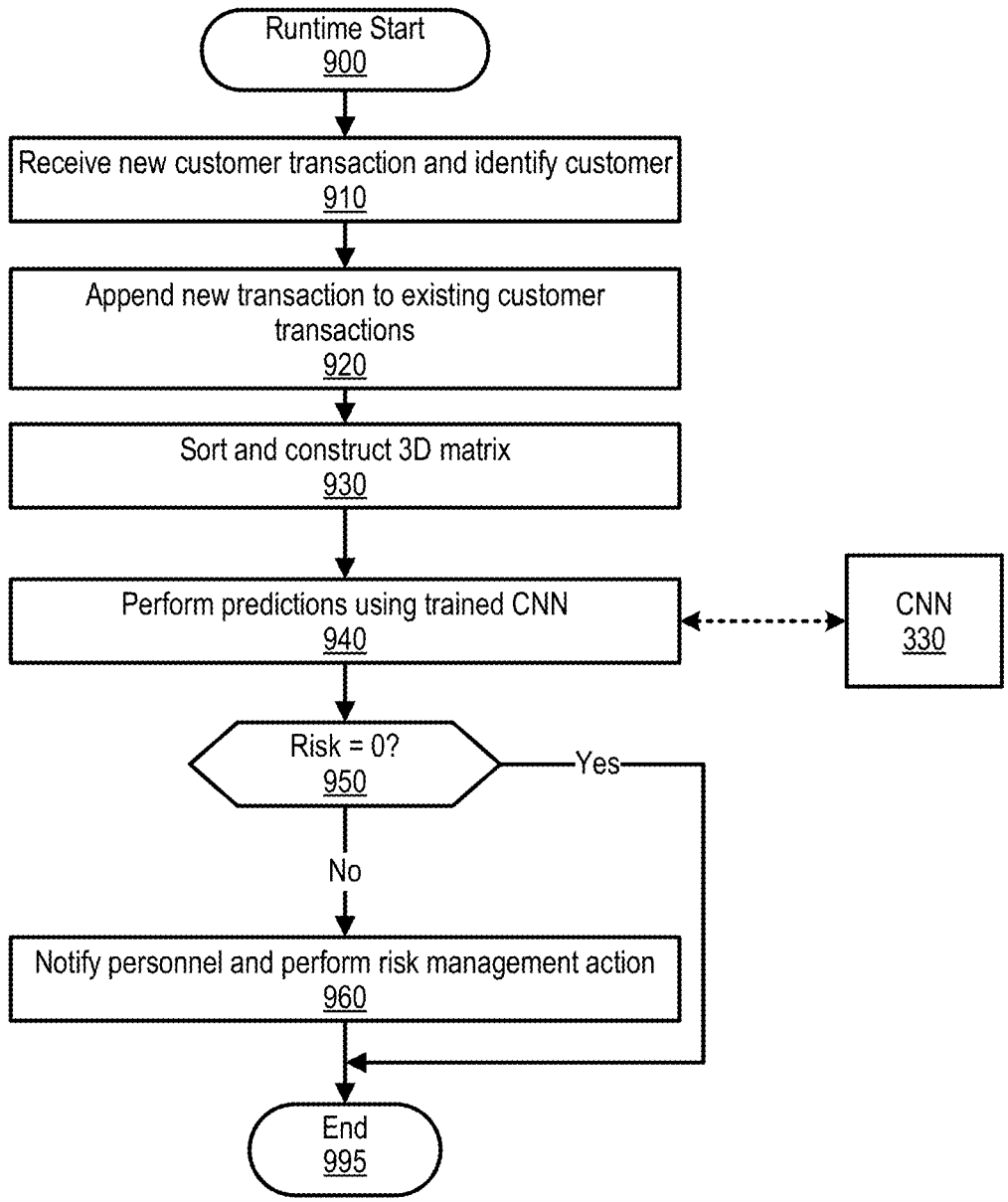
FIG. 9 is an exemplary flowchart depicting steps taken to use a trained convolutional neural network to predict a risk level of an incoming transaction.

FIG. 9 is an exemplary flowchart depicting steps taken to use a trained convolutional neural network to predict a risk level of an incoming transaction. The process performs predicting steps in FIG. 9 to determine whether the customer is attempting to perform a risk transaction and the process takes actions accordingly.

FIG. 9 processing commences at 900 whereupon, at step 910, the process receives a new customer transaction and identifies the customer corresponding to the transaction. At step 920, the process appends the new transaction to the identified customer's existing customer. At step 930, the process sorts and construct a 3D matrix (see FIG. 8, steps 825 through 870 and corresponding text for further details).

At step 940, the process performs predictions using the trained CNN. In one embodiment, CNN 330 has sets of trained weights/parameters and, for each layer, CNN 330 calculates the prepared data with the weights/parameters, then CNN 330 calculates a final value as the prediction result.

The process determines as to whether the output of CNN 330 generated a risk=0 (valid) or risk=1 (fraudulent) (decision 950). If risk=0, then decision 950 branches to the 'yes' branch bypassing fraudulent notification step 960. On the other hand, if the risk=1, then decision 950 branches to the 'no' branch whereupon, at step 960, the process notifies personnel and performs risk management action, such as aborting the current transaction, forbidding the customer business operation, notifying compliance department, etc. FIG. 9 processing thereafter ends at 995.

Figure 10:
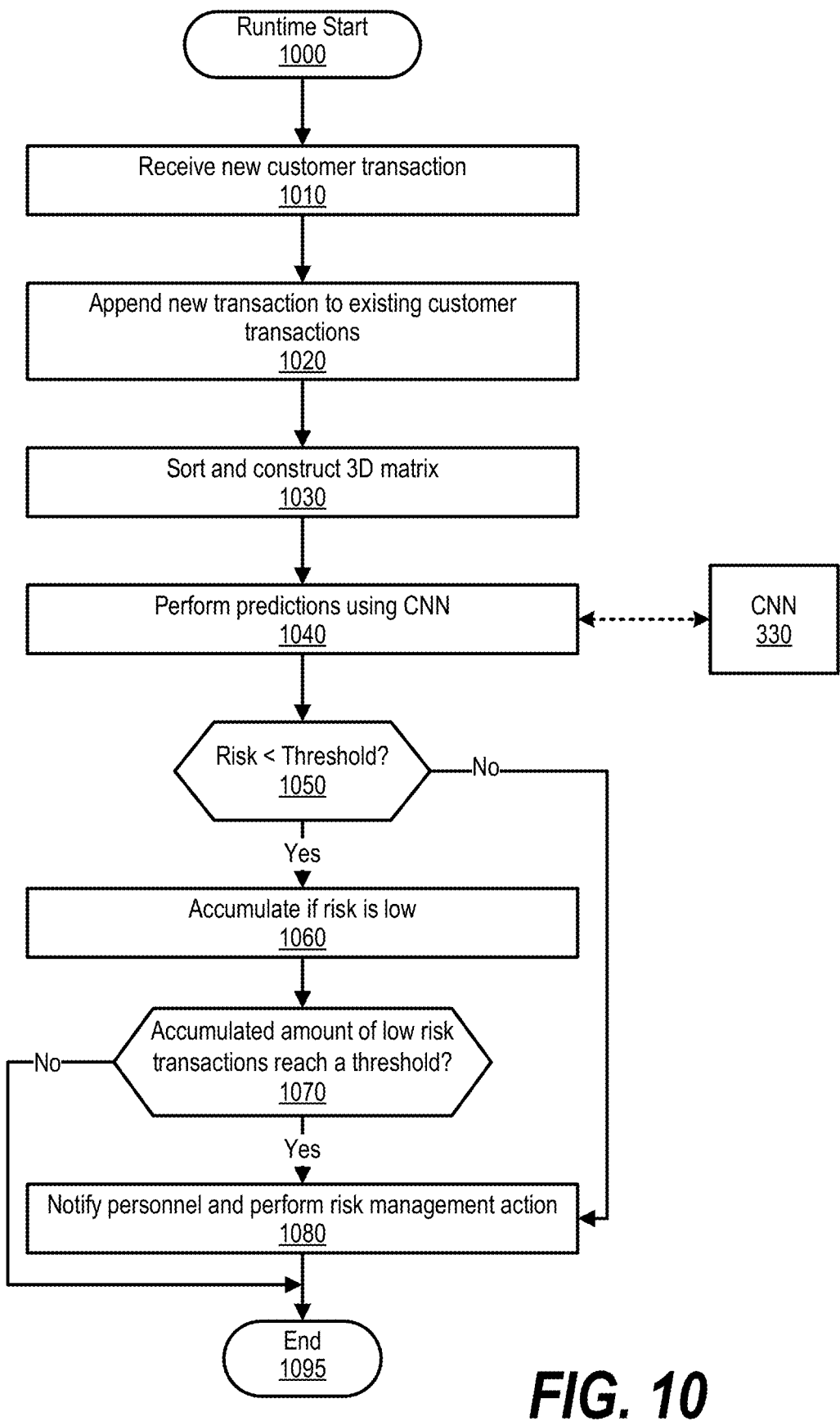
FIG. 10 is an exemplary flowchart depicting steps of another embodiment to predict a risk level of an incoming transaction using a trained convolutional neural network.

FIG. 10 is an exemplary flowchart depicting steps of another embodiment to predict a risk level of an incoming transaction using a trained convolutional neural network. FIG. 10 shows steps corresponding to an embodiment by risk assessment engine 300 that performs steps to accumulate risk prediction result, and then acts in advance. FIG. 10 shows steps taken in one embodiment to predict new transaction risk levels based on all transaction's features of a customer, so then even when each individual transaction are normal or low risk, the potential risk is still revealed in advance. Based on multiple risk level classification, the risk prediction result can be accumulated. For example, one low risk transaction may not cause concern, but three low risk transactions will trigger a risk management action. In turn, risk is revealed in advance of authorization instead of lagging after transaction authorization.

FIG. 10 processing commences at 1000 whereupon, at step 1010, the process receives a new customer transaction and identifies the customer corresponding to the transaction. At step 1020, the process appends the new transaction to the identified customer's existing customer. At step 1030, the process sorts and constructs a 3D matrix (see FIG. 8, steps 825 through 870 and corresponding text for further details).

At step 1040, the process performs predictions using the trained CNN as discussed above. The predicting purpose is to determine whether the customer is attempting to perform a risk transactions based on the normal transactions.

The process determines as to whether the output risk value of CNN 330 is less than a risk threshold (decision 1050). If the risk value is not less than the risk threshold, the decision 1050 branches to the 'no' branch whereupon, at step 1080, the process notifies personnel and performs risk management action.

On the other hand, if the risk value is less than the risk threshold, then decision 1050 branches to the 'no' branch whereupon, at step 1060, the process accumulates if the risk level is low. For example, customer A transfers $100 to customer B, and then customer B immediately transfers $100 back to customer A. In this example, each transaction is low risk, but if these transfers occur frequently (e.g., 10 times), and then the process flags the transactions as a high risk.

The process determines as to whether the accumulated amount of low risk transactions reaches a threshold (decision 1070). If the accumulated amount of low risk transactions reaches a threshold, then decision 1070 branches to the 'yes' branch whereupon, at step 1080, the process notifies personnel and performs a risk management action. On the other hand, if the accumulated amount of low risk transactions does not reach a threshold, then decision 1070 branches to the 'no' branch bypassing step 1080. FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
    constructing a 3-dimensional (3D) matrix based on a plurality of historical transactions performed by a user, wherein the 3D matrix comprises a set of features, a set of rows, and a set of channels;
    training a convolutional neural network using the 3D matrix;
    predicting, by the trained convolutional neural network, a risk level of a new transaction initiated by the user;
    transmitting an alert message based on the predicted risk level;
    modifying the 3D matrix based on adding the new transaction to the plurality of historical transactions;
    re-training the convolutional neural network using the modified 3D matrix;
    predicting, by the re-trained convolutional neural network, a different risk level of a different new transaction initiated by the user; and
    transmitting a different alert message in response to determining that an accumulation of the risk level with the different risk level reaches an accumulation threshold.

2. The computer-implemented method of claim 1 wherein the constructing of the 3D matrix further comprises:
    retrieving the plurality of historical transactions performed by the user, wherein the plurality of historical transactions comprise the set of features and the set of rows, and wherein each row in the set of rows corresponds to one of the plurality of historical transactions; and
    generating the set of channels from the set of features and the set of rows, wherein the generating of the set of channels further comprises:
        for each feature in the set of features:
            selecting one of the set of features;
            sorting the set of rows on the selected feature; and
            storing the sorted rows as one channel in the set of channels corresponding to the selected feature.

3. The computer-implemented method of claim 2 further comprising:
    transposing the 3D matrix by copying an original index $R_n F_n C_n$ of the 3D matrix to a new index of $F_n C_n R_n$, wherein R is the set of rows, F is the set of features, and C is the set of channels; and
    training the convolutional neural network using the transposed 3D matrix.

4. The computer-implemented method of claim 3 further comprising:
    prior to transposing the 3D matrix, adjusting an amount of rows in the set of rows to equal a predetermined amount of transactions.

5. The computer-implemented method of claim 1 further comprising:
    determining that the risk level of the new transaction is low; and
    determining that the different risk level of the different new transaction is low.

6. The computer-implemented method of claim 1 further comprising:
    automatically aborting the transaction from completing in response to determining that the risk level of the new transaction reaches a risk threshold.

7. An information handling system comprising:
    one or more processors;
    a memory coupled to at least one of the processors;
    a set of computer program instructions stored in the memory and executed by at least one of the processors in order to perform actions of:

constructing a 3-dimensional (3D) matrix based on a plurality of historical transactions performed by a user, wherein the 3D matrix comprises a set of features, a set of rows, and a set of channels;

training a convolutional neural network using the 3D matrix;

predicting, by the trained convolutional neural network, a risk level of a new transaction initiated by the user;

transmitting an alert message based on the predicted risk level;

modifying the 3D matrix based on adding the new transaction to the plurality of historical transactions;

re-training the convolutional neural network using the modified 3D matrix;

predicting, by the re-trained convolutional neural network, a different risk level of a different new transaction initiated by the user; and transmitting a different alert message in response to determining that an accumulation of the risk level with the different risk level reaches an accumulation threshold.

8. The information handling system of claim 7 wherein the processors perform additional actions comprising:

retrieving the plurality of historical transactions performed by the user, wherein the plurality of historical transactions comprise the set of features and the set of rows, and wherein each row in the set of rows corresponds to one of the plurality of historical transactions; and generating the set of channels from the set of features and the set of rows, wherein the generating of the set of channels further comprises:
for each feature in the set of features:
selecting one of the set of features;
sorting the set of rows on the selected feature; and
storing the sorted rows as one channel in the set of channels corresponding to the selected feature.

9. The information handling system of claim 8 wherein the processors perform additional actions comprising:

transposing the 3D matrix by copying an original index $R_n F_n C_n$ of the 3D matrix to a new index of $F_n C_n R_n$, wherein R is the set of rows, F is the set of features, and C is the set of channels; and training the convolutional neural network using the transposed 3D matrix.

10. The information handling system of claim 9 wherein the processors perform additional actions comprising:

prior to transposing the 3D matrix, adjusting an amount of rows in the set of rows to equal a predetermined amount of transactions.

11. The information handling system of claim 7 wherein the processors perform additional actions comprising:

determining that the risk level of the new transaction is low; and determining that the different risk level of the different new transaction is low.

12. The information handling system of claim 7 wherein the processors perform additional actions comprising:

automatically aborting the transaction from completing in response to determining that the risk level of the new transaction reaches a risk threshold.

13. A computer program product stored in a non-transitory computer readable storage medium, comprising computer program code that, when executed by an information handling system, causes the information handling system to perform actions comprising:

constructing a 3-dimensional (3D) matrix based on a plurality of historical transactions performed by a user, wherein the 3D matrix comprises a set of features, a set of rows, and a set of channels;

training a convolutional neural network using the 3D matrix;

predicting, by the trained convolutional neural network, a risk level of a new transaction initiated by the user;

transmitting an alert message based on the predicted risk level;

modifying the 3D matrix based on adding the new transaction to the plurality of historical transactions;

re-training the convolutional neural network using the modified 3D matrix;

predicting, by the re-trained convolutional neural network, a different risk level of a different new transaction initiated by the user; and transmitting a different alert message in response to determining that an accumulation of the risk level with the different risk level reaches an accumulation threshold.

14. The computer program product of claim 13 wherein the information handling system performs further actions comprising:

retrieving the plurality of historical transactions performed by the user, wherein the plurality of historical transactions comprise the set of features and the set of rows, and wherein each row in the set of rows corresponds to one of the plurality of historical transactions; and generating the set of channels from the set of features and the set of rows, wherein the generating of the set of channels further comprises:
for each feature in the set of features:
selecting one of the set of features;
sorting the set of rows on the selected feature; and
storing the sorted rows as one channel in the set of channels corresponding to the selected feature.

15. The computer program product of claim 14 wherein the information handling system performs further actions comprising:

transposing the 3D matrix by copying an original index $R_n F_n C_n$ of the 3D matrix to a new index of $F_n C_n R_n$, wherein R is the set of rows, F is the set of features, and C is the set of channels; and training the convolutional neural network using the transposed 3D matrix.

16. The computer program product of claim 15 wherein the information handling system performs further actions comprising:

prior to transposing the 3D matrix, adjusting an amount of rows in the set of rows to equal a predetermined amount of transactions.

17. The computer program product of claim 13 wherein the information handling system performs further actions comprising:

determining that the risk level of the new transaction is low; and determining that the different risk level of the different new transaction is low.

* * * * *